United States Patent [19]

Shelton

[11] Patent Number: 5,505,425
[45] Date of Patent: Apr. 9, 1996

[54] WHEELED SUPPORT FOR VEHICLES

[75] Inventor: Louis C. Shelton, Valdosta, Ga.

[73] Assignee: Thomas K. Hamilton, Gainesville, Fla.; a part interest

[21] Appl. No.: 173,824

[22] Filed: Dec. 27, 1993

[51] Int. Cl.⁶ ................................. F16M 1/00
[52] U.S. Cl. .................. 248/670; 248/172; 248/505; 269/17
[58] Field of Search ................ 248/670, 671, 248/676, 505, 499, 172, 680; 269/17, 69; 280/35, 79.11, 79.6

[56]      References Cited

U.S. PATENT DOCUMENTS

| 1,363,020 | 12/1920 | Shewalter | 269/17 X |
| 1,600,835 | 9/1926 | Manley | 248/172 X |
| 1,812,585 | 6/1931 | Collins | 248/172 X |
| 3,420,481 | 1/1969 | Arnes | 248/505 X |
| 3,949,976 | 4/1976 | Cofer | 269/17 |
| 4,383,681 | 5/1983 | Walters | 269/17 |
| 4,804,162 | 2/1989 | Rice | 248/671 |
| 5,024,002 | 6/1991 | Possati | 248/676 X |
| 5,181,821 | 1/1993 | King, Sr. | 269/17 X |
| 5,308,037 | 5/1994 | Gonzalez | 248/670 |

FOREIGN PATENT DOCUMENTS 35456   12/1929   France ..................... 269/17

Primary Examiner—Karen J. Chotkowski
Attorney, Agent, or Firm—James B. Middleton

[57]          ABSTRACT

A vehicle support has two separate support members that can be connected by a center member of variable length. Each of the support members has casters for easy rolling, and a vertically adjustable beam for varying the height of the support. When two support members are connected by the center member, a stable vehicle support is formed. Cradles on the supports receive the axle or other part of a vehicle, and a chain can be passed over the axle and fixed to the support for fixing the vehicle to the vehicle support.

9 Claims, 2 Drawing Sheets

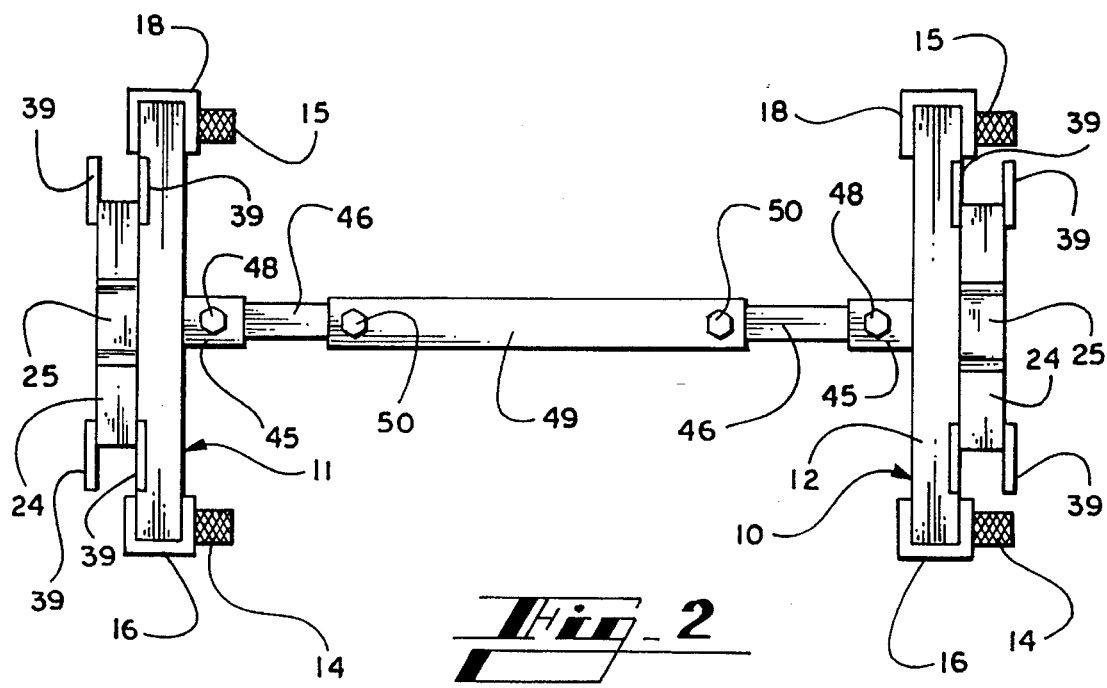
Fig. 2
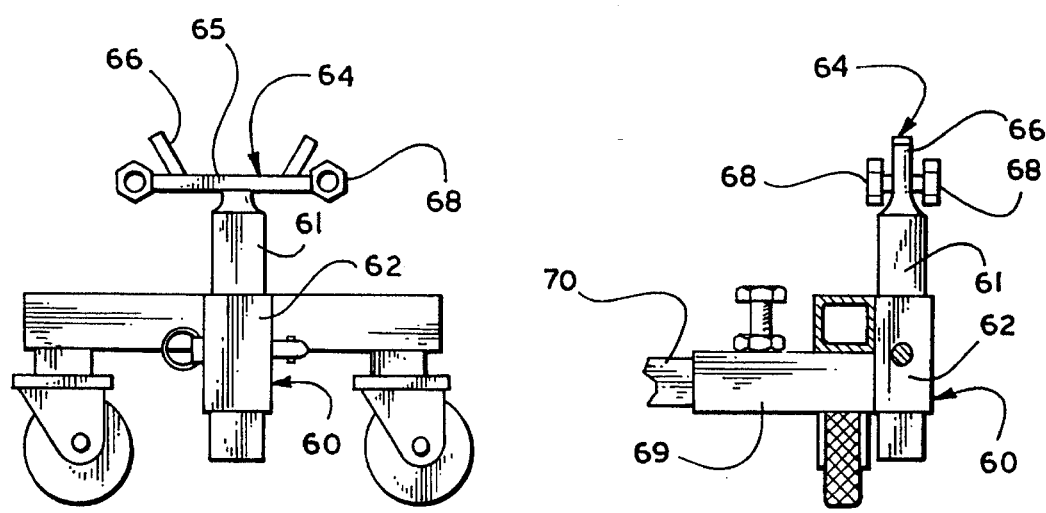
Fig. 3
Fig. 4

WHEELED SUPPORT FOR VEHICLES

BACKGROUND OF THE INVENTION

1. Field of the Invention

This invention relates generally to supports for vehicles, and is more particularly concerned with a collapsible, wheeled support.

2. Discussion of the Prior Art

When a vehicle is being serviced, it is frequently necessary to lift the vehicle so a mechanic can reach parts on the bottom of the vehicle. In some situations, one will use a hydraulic lift to elevate the entire vehicle as needed. However, some shops or individuals may not have access to a hydraulic lift, or the lift may be in use. Also, it may not be good economic use of a hydraulic lift when only one end of a vehicle needs to be lifted. In these various circumstances one generally utilizes a jack to elevate the vehicle, then uses jack stands to hold the vehicle securely in the elevated position.

There are several disadvantages accompanying the use of jack stands. First, it will be understood that the jack stands have a relatively small base. Some jack stands are adjustable in height; but, if the height is greatly increased, the jack stand becomes somewhat unstable because of the small base. Also, one jack stand supports one point of a vehicle. If one end of a vehicle is to be supported, at least two jack stands are required; and, if the entire vehicle is to be supported, at least four jack stands are usually required. Each of the jack stands must be individually placed.

If any change is to be made when a vehicle is supported by jack stands, each jack stand must be individually relieved of its load, and adjusted as desired. Such a procedure is obviously time consuming. Furthermore, if the vehicle on jack stands is to be relocated—even within the same shop—, the vehicle must be removed from the jack stands, relocated, then replaced on the jack stands. If the wheels of the vehicle have been removed, one of course must replace the wheels before removing the jack stands.

There have been some prior art efforts at providing other forms of support for vehicles, and some of these have had wheels to allow easy manipulation of the support. Most of the prior art supports have been designed as special purpose supports, and have been rather complex. The result is that the prior art supports are not practical for general use in servicing vehicles.

SUMMARY OF THE INVENTION

The present invention provides a vehicle support comprising a pair of wheeled support members connected by an adjustable center member selectively connectable to each of the support members. Each of the support members has a cradle member for receiving a portion of the vehicle to be supported, and means are provided for adjusting the height of the cradle member with respect to the support member. It is also contemplated that, when an axle or the like is the portion of the vehicle received by the cradles, a safety chain may be passed around the vehicle portion and fixed to the cradle member. It is contemplated that the support members will have casters that allow easy movement of the vehicle support, with or without a vehicle on the support.

BRIEF DESCRIPTION OF THE DRAWINGS

These and other features and advantages of the present invention will become apparent from consideration of the following specification when taken in conjunction with the accompanying drawings in which:

FIG. 2 a top plan view of the device shown in FIG. 1;

FIG. 3 is a side elevational view showing a modified form of the invention; and, FIG. 4 is a cross-sectional view taken generally along the line 4—4 in FIG. 3.

DETAILED DESCRIPTION OF THE EMBODIMENTS

Figure 1:
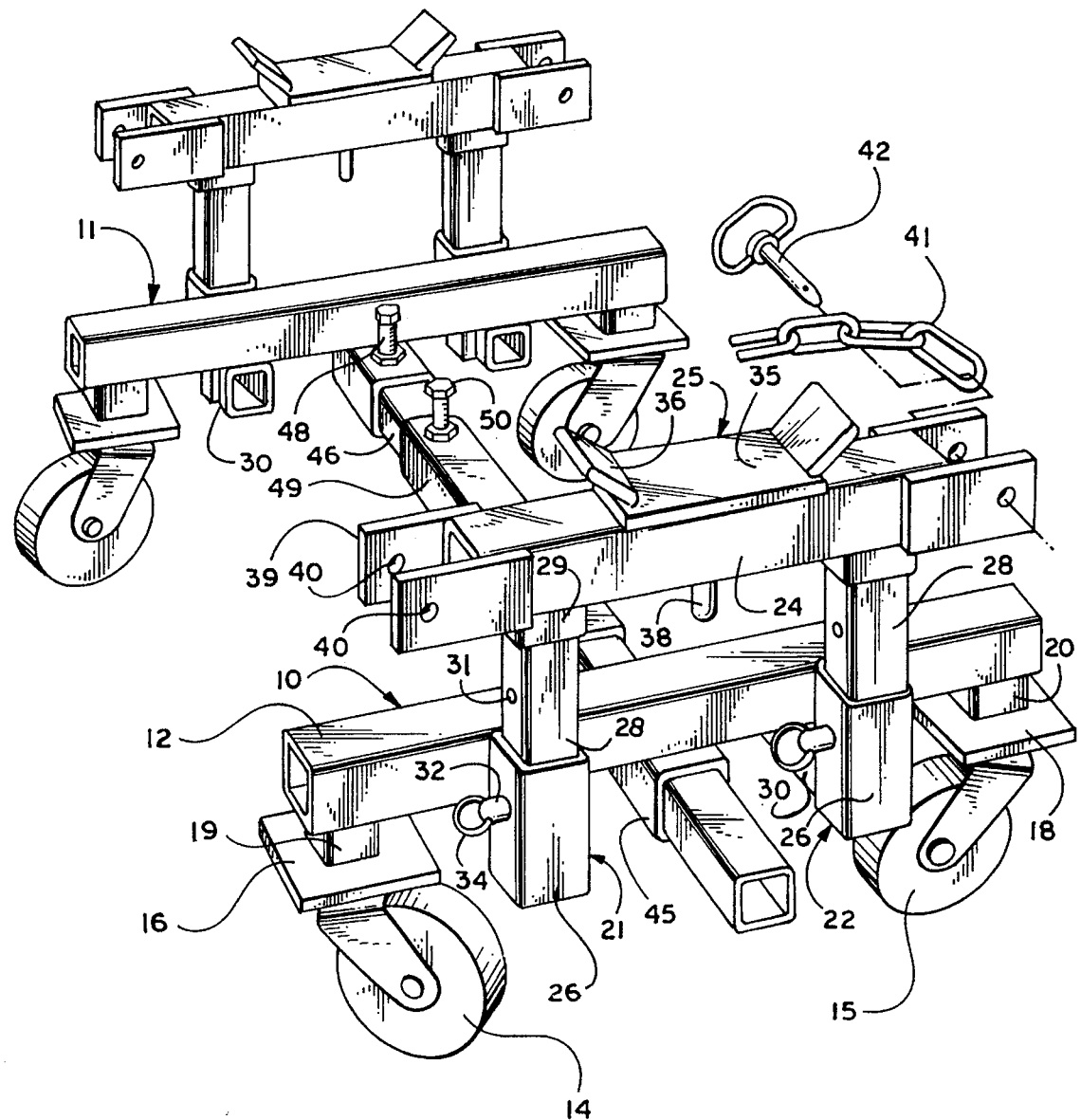
FIG. 1 is a perspective view showing one form of vehicle support made in accordance with the present invention.

Referring now more particularly to the drawings, and to those embodiments of the invention here presented by way of illustration, the device shown in FIG. 1 includes a pair of support members designated at 10 and 11. The support members 10 and 11 are mirror images of each other, so only one will be described in detail.

The support member 10 includes a longitudinal beam 12 having casters 14 and 15 at each end thereof. As here shown, the casters 14 and 15 are fixed to plates 16 and 18 which are fixed to the beam 12 by pillows 19 and 20. It will be obvious that other mechanical arrangements may be used, but the pillows 19 and 20 provide the desired height to the longitudinal beam 12.

Between the casters 14 and 15 there are stanchions 21 and 22 carrying secondary beam 24, the secondary beam 24 supporting a cradle 25. In more detail, the stanchions 21 and 22 include sleeves 26 fixed to the longitudinal beam 12, the sleeves 26 receiving standards 28. The secondary beam 24 has sockets 29 that receive the upper ends of the standards 28.

It will be realized by those skilled in the art that the device shown in the drawings is formed of conventional square tubing. In using conventional tubing, the standards 28 are selected to be slidably received within the sleeves 26 and the sockets 29. To strengthen the connection of the sleeves 26 to the longitudinal beam 12, blocks 30 are fixed to the bottom surface of the beam 12, and to the sleeves 26. The block 30 may of course also be a short length of square tubing.

As here shown, the secondary beam 24 is vertically adjustable to vary the height at which a vehicle is supported. The adjustment comprises simply holes 31 through the standards 28 that are alignable with holes 32 in the sleeves 26. Pins 34 can then be inserted to secure the standards 28 with respect to the sleeves 26.

Another versatile feature of the present invention is the cradle 25. In FIG. 1, the cradle comprises a base plate 35 having flanges 36 to confine a vehicle part to the base plate 35. The base plate 35 is then fixed to the secondary beam 24 by means of a pin 38 which passes through an appropriate hole in the secondary beam 24. Since a single pin holds the cradle 25, it will be understood that the cradle can rotate about the centerline of the pin 38. Thus, the cradle can be adjusted rotationally to receive various vehicle parts.

In some circumstances, it may be desirable to fix a vehicle to the vehicle support. For this purpose, the secondary beam 24 has forwardly and rearwardly extending ears 39 which are on each side of the cradle, each of the ears 39 defining a hole therethrough. A chain 41 can therefore be passed over the axle or other vehicle part resting on the cradle 25, and fixed to the ends of the secondary beam 24 by the ears 39. As here shown, pins 42 will pass through the holes 40 and through the chain 41.

Centrally of the longitudinal beam 12, there is a transverse sleeve 45. The transverse sleeve 45 is adapted to receive a transverse connecting member 46, which is slidably received within the transverse sleeve 45. A set screw 48, best shown in FIG. 2 of the drawings, selectively fixes the connecting member 46 to the sleeve 45.

The above discussion of the support member is directed to the support member 10. As is stated above, the member 11 is a mirror image of the member 10, so the description does not need to be repeated, and the same parts on the two support members carry the same reference numerals. The transverse connecting member 46, then connects the member 10 to the member 11. Each of the support members 10 and 11 has only two wheels, so neither is stable by itself; however, by connecting together the two members, a very stable, four wheeled vehicle support is provided. Furthermore, the connection is adjustable so the vehicle support can be adjusted to fit a variety of vehicles.

It will be realized that the connecting member 46 is slidably received in the sleeve 45, so the position of the support member 10 along the connecting member 46 is variable. The connecting member 46 includes a coupling 49 having a pair of set screws 50. The connecting member 46 is discontinuous within the coupling 49, so the member 46 can be adjusted with respect to the coupling, then fixed in the desired position with the set screws 50.

In view of the construction of the vehicle support as described above, it will be understood that the vehicle support can be easily disassembled for storage. The connecting member 46 is easily removed from the sleeves 45; and, the connecting member 46 can be shortened by separating the member 46 from the coupling 49. The standards 28 can be separated from the sleeves 26 and from the sockets 29, so the largest single piece is the longitudinal beam with the casters 14 and 15 attached. The entire vehicle support can therefore be stored in a small space, and conveniently transported if desired.

Looking at FIGS. 3 and 4 of the drawings, it can be seen that a lighter version of the vehicle support is shown. The primary difference is that the stanchion 60 includes a single standard 61 receivable within a sleeve 62. The cradle 64 comprises the base plate 65 with flanges 66 and ears 68 defining holes therethrough.

Especially in FIG. 4 it can be seen that the block for strengthening the sleeve 62 is the same piece as the transverse sleeve 69. The sleeve 69 receives the connecting member 70 as described previously.

The operation of the embodiment shown in FIGS. 3 and 4 is the same as the previously described embodiment, so no separate description is thought to be necessary.

In view of the foregoing discussion, it will be understood that the vehicle support of the present invention provides a support that can be disassembled for storage in a small space, and quickly and easily assembled for use. When assembling the device for use, one will consider the vehicle or the like to be supported, and the height of the standard and the length of the connecting member will be selected as appropriate.

In use, the vehicle will be lifted by a conventional jack or the like, then the vehicle support of the present invention rolled into place. The vehicle will then be lowered to rest on the vehicle support. The chains or other fastening means can be passed around a portion of the vehicle if desired.

Since the vehicle support has casters, it will be recognized that a vehicle on the support can be moved without removing the vehicle from the support. The vehicle can be pushed across the shop floor, and the casters allow full control of the direction of the vehicle. Further, a vehicle may have one end supported on one device, or the vehicle may be entirely supported, at both ends thereof, by two of the devices. Even fully supported, the vehicle can be easily moved by simply pushing the vehicle across the floor.

If should also be understood that the transverse connecting member in the present invention is preferably at such a height that a conventional floor jack can pass beneath the connecting member. This feature allows the vehicle to be lifted by a floor jack, and the vehicle support to be put into place. The floor jack can then be pulled from under the vehicle, under the connecting member.

Considering the foregoing discussion, those skilled in the art will realize that the device of the present invention may include hydraulic cylinders or the like as vertical and/or as horizontal adjustments of the device. For example a fluid operated cylinder may replace the connection member 46 and the cooperating sleeves. Also, fluid operated cylinders may replace the standards 21, 22 and 60. Thus, any of the adjustable portions of the support device described above may be replaced by fluid operated cylinders, mechanical screws, or other power arrangements.

It will of course be understood by those skilled in the art that the particular embodiments of the invention here presented are by way of illustration only, and are meant to be in no way restrictive; therefore, numerous changes and modifications may be made, and the full use of equivalents resorted to, without departing from the spirit or scope of the invention as outlined in the appended claims.

I claim:

1. A vehicle support for supporting one end of a vehicle, said vehicle including an axle extending transversely of said one end, said vehicle support comprising a pair of support members selectively connectable in spaced relation to each other, each support member of said pair of support members including a longitudinal beam having a fixed length, wheels for carrying said longitudinal beam, said wheels comprising one wheel at each end of said longitudinal beam, at least one stanchion fixed to said longitudinal beam centrally of said longitudinal beam, a cradle carried by said at least one stanchion above said longitudinal beam for receiving one end of said axle of the vehicle to be supported, and a selectively extendible transverse center member for selectively connecting said support members of said pair of support members to each other with one of said support members at one side of the vehicle and the other of said support members at the opposite side of the vehicle for supporting said one end of the vehicle.

2. A vehicle support as claimed in claim 1, and including a secondary beam above and supported from and parallel to said longitudinal beam, said at least one stanchion extending from said longitudinal beam upwardly to said secondary beam for supporting said secondary beam, said stanchion including a sleeve fixed to said longitudinal beam, a standard slidably received within said sleeve, and means for selectively fixing said standard with respect to said sleeve.

3. A vehicle support as claimed in claim 2, wherein said cradle is mounted on and is rotatable with respect to said secondary beam.

4. A vehicle support as claimed in claim 3, said transverse center member including a sleeve fixed to each longitudinal beam transversely thereof, and a connecting member selectively slidably received in said sleeve, and means for fixing said connecting member with respect to said sleeve.

5. A vehicle support as claimed in claim 4, said connecting member comprising a plurality of segments, and a coupling for selectively fixing two of said plurality of segments with respect to each other.

6. A vehicle support as claimed in claim 5, and further including means for selectively fixing the portion of the vehicle to said cradle.

7. A vehicle support as claimed in claim 6, and including ears disposed at each end of said cradle, said ears defining holes therethrough, a chain extendible from said ears at one end of said cradle to said ears at the opposite end, and pin means for selectively fixing said chain to said ears.

8. A vehicle support as claimed in claim 7, and including means for adjusting the height of said cradle.

9. A vehicle support as claimed in claim 8, wherein transverse center member is adjustable in length for providing variable spacing of said pair of support members.

* * * * *